US008803899B2

(12) United States Patent
Chen et al.

(10) Patent No.: US 8,803,899 B2
(45) Date of Patent: Aug. 12, 2014

(54) IMAGE PROCESSING SYSTEM AND IMAGE PROCESSING METHOD

(75) Inventors: Jiunn-Kuang Chen, Hsinchu Hsien (TW); Hung-Yi Lin, Hsinchu Hsien (TW); Yuan-Ming Liu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 758 days.

(21) Appl. No.: 12/763,406

(22) Filed: Apr. 20, 2010

(65) Prior Publication Data

US 2010/0283792 A1 Nov. 11, 2010

Related U.S. Application Data

(60) Provisional application No. 61/176,476, filed on May 7, 2009.

(51) Int. Cl.
*G06F 12/02* (2006.01)

(52) U.S. Cl.
USPC ............ 345/544; 345/87; 345/419; 345/547; 345/619; 348/42; 348/51

(58) Field of Classification Search
CPC ......... G09G 5/39; G09G 5/363; G09G 5/393; G09G 5/395; G06T 1/60
USPC ......... 345/87, 419, 544, 547, 619; 348/42, 51
See application file for complete search history.

(56) References Cited

U.S. PATENT DOCUMENTS

| | | | | |
|---|---|---|---|---|
| 5,499,062 | A * | 3/1996 | Urbanus | 348/771 |
| 6,040,852 | A * | 3/2000 | Stuettler | 348/43 |
| 6,061,083 | A | 5/2000 | Aritake et al. | |
| 6,980,210 | B1 * | 12/2005 | Weiglhofer et al. | 345/419 |
| 7,184,002 | B2 * | 2/2007 | Lipton et al. | 345/6 |
| 2002/0000994 | A1 | 1/2002 | Bergstrom et al. | |
| 2004/0264764 | A1 * | 12/2004 | Kochi et al. | 382/154 |
| 2006/0145978 | A1 * | 7/2006 | Takatori et al. | 345/87 |
| 2008/0252649 | A1 * | 10/2008 | Rai et al. | 345/535 |
| 2009/0002481 | A1 * | 1/2009 | Kim et al. | 348/42 |
| 2009/0146914 | A1 * | 6/2009 | Seong et al. | 345/6 |
| 2009/0160931 | A1 * | 6/2009 | Pockett et al. | 348/42 |
| 2010/0164966 | A1 * | 7/2010 | Sakariya | 345/520 |
| 2011/0261050 | A1 * | 10/2011 | Smolic et al. | 345/419 |

FOREIGN PATENT DOCUMENTS

CN 1825413 A 8/2006

OTHER PUBLICATIONS

Taiwan Office Action dated Mar. 28, 2013, 12 pages.

* cited by examiner

*Primary Examiner* — Xiao Wu
*Assistant Examiner* — Todd Buttram
(74) *Attorney, Agent, or Firm* — Edell, Shapiro & Finnan, LLC

(57) ABSTRACT

An image processing system includes a memory, a data slicer and an image processor. The data slicer divides each of current image data and adjacent image data into a first portion and a second portion to be stored into the memory. The image processor reads from the memory the first portion and the second portion of the current image data and the first portion of the adjacent image data for image processing.

20 Claims, 5 Drawing Sheets

IMAGE PROCESSING SYSTEM AND IMAGE PROCESSING METHOD

CROSS REFERENCE TO RELATED PATENT APPLICATION

This patent application claims the benefit of U.S. provisional patent application No. 61/176,476 filed on May 7, 2009, which is incorporated herein by reference in its entirety.

FIELD OF THE INVENTION

The present invention relates to image display technology, and more particularly, to a method for accessing a memory of an image display system.

BACKGROUND OF THE INVENTION

In numerous image processing systems, a time for accessing image data from a memory is controlled to adjust how a video frame is displayed. For example, image data corresponding to a plurality of video frames is temporarily stored into a memory, and is read from the memory with a relatively high operating frequency by an image processing circuit, so as to achieve an effect of improving a display frequency of the video frames. In a stereo image system, such approach may be applied to extend a vertical blanking interval (VBI) of an image.

In a current mainstream stereo image display technology, left-eye images and right-eye images are alternately displayed. When the left-eye images are displayed, a pair of stereo glasses worn by a viewer shields a right eye of the viewer. Likewise, when the right-eye images are displayed, the pair of stereo glasses worn by the viewer shields a left eye of the viewer. A visual system of the viewer then combines the left-eye and right-eye images to render a stereo image. Due to the persistence of vision, the viewer remains unaware that a scene currently in sight is shielded by the pair of stereo glasses in certain periods provided that the alternating speed between the left and right images is fast enough.

FIG. 1 shows a timing diagram when displaying an image data in a stereo image display system. A period T1 is for updating a display data with a right-eye image, and a period T3 is for updating the display data with a left-eye image. Taking a liquid crystal display (LCD) as an example, during the two periods T1 and T3, a driving circuit of a display adjusts rotation angles of liquid crystal molecules by providing different control voltages, thereby changing a frame currently displayed on the display. A majority of displays update data of pixels within the display frame row-by-row instead of updating them simultaneously. Therefore, before the period T1 completely ends, the frame currently displayed on the display actually contains not only an updated right-eye image, but also a partial left-eye image that is not yet updated. Likewise, before the period T3 completely ends, the frame currently displayed on the display actually contains not only an updated left-eye image, but also a partial right-eye image that is not yet updated.

In order to avoid interferences on the visual system of the viewer, the pair of stereo glasses is designed to shield both eyes of the viewer during the period T1, and only open a shutter corresponding to the right eye (to be referred to as the right-eye shutter) after the period T1 ends to allow the right eye of the viewer to perceive the updated right-eye image. That is, in the example shown in FIG. 1, during a period T2, the right-eye shutter is opened while a shutter corresponding to the left eye (to be referred to as the left-eye shutter) is closed. After that, during the period T3, the pair of 3D glasses shields both eyes of the viewer, and only opens the left-eye shutter after the period T3 ends to allow the viewer to perceive the updated left-eye image. During the period T4, the left-eye shutter is opened while the right-eye shutter is closed. The periods T2 and T4 in FIG. 1 are the so-called VBIs. A period T5 following the period T4 is for updating the display data with the updated right-eye image.

As observed from the foregoing description, when viewing a stereo image via the pair of stereo glasses, the viewer can only see an image during VBIs. When the VBIs are too short, the viewer may find that brightness of the frame is insufficient due to the lack of light entering the eyes of the viewer, to even lead to a failure of forming the persistence of vision in the brain of the viewer.

FIG. 2A and FIG. 2B show timing diagrams for illustrating extending VBIs by increasing a frequency of reading an image data from a memory. FIG. 2A shows an original timing diagram of image data inputted into a display system, i.e., a timing diagram of image data to be stored into a buffer of the display system. A period T1, a time for storing a frame data of a right-eye image into the buffer, comprises sub-periods, each of which has a time length of t1 and corresponds to pixels of a row in the right-eye image. For example, during a first sub-period t1 of the period T1, a first row data of the right-eye image is stored into the buffer; during a second sub-period t1, the second row data of the right-eye image is stored into the memory, and so forth. A period T2 in FIG. 2A is an original VBI.

FIG. 2B shows a timing diagram when reading image data from a buffer, i.e., the timing diagram illustrates timing for transmitting and displaying the image data on a display panel. A period T1", a time for reading a frame data of a right-eye image from the buffer, comprises sub-periods, each of which has a time length of t1" and corresponds to pixels of a row of the right-eye image. For example, during a first sub-period t1" of the period T1", a first row data of the right-eye image is read from the buffer. Since a total of pixel data of each frame of the image data stays constant and the sub-period t" is shorter than the sub-period t1, an image processing system reads from the buffer data of the right-eye image with a relatively high operating frequency to reduce a total time length of the period T1". Accordingly, under circumstances that T1" plus T2" is equal to T1 plus T2, an adjusted VBI T2" is longer than an original VBI T2. Likewise, an original VBI T4 may also be increased to a VBI T4" in FIG. 2B.

As for an LCD monitor, image data read from a buffer may first be processed for overdriving, and then be transmitted to a driving circuit of the LCD monitor. In the overdrive technology, a response time needed for achieving a predetermined rotation effect of liquid crystal cells is reduced by providing voltage values that are higher or lower than a target voltage to the liquid crystal cells, so as to increase a speed and smoothness when switching between frames.

FIG. 3 shows a block diagram of an LCD system having capabilities of lengthening a VBI and overdrive. An LCD system 10 comprises a memory interface 11, a memory 12, an image processor 13, an overdrive unit 14, and an LCD unit 15. The memory interface unit 11 is a medium for the memory to communicate with other circuits. In FIG. 3, a step of temporarily storing a plurality of original image data into the memory 12 via the memory interface unit 11 is represented by an arrow A. The plurality of original image data correspond to a series of original frames inputted into the LCD system 10 according to a time sequence.

The image processor 13 performs adjustment on the plurality of the original frames, e.g., adjustment on white balance or hue. The step of reading and transmitting the desired frames from the memory 12 via the memory interface unit 11 to the image processor 13 is represented by an arrow B in FIG. 3. In order to extend the VBIs, in the reading step represented by the arrow B and performed by the memory interface unit 11, a frequency is designed as being higher than that in the storing step represented by the arrow A.

Data of the frames processed by the image processor 13 are transmitted to the overdrive unit 14, which checks a look-up table according to a grayscale difference between a previous frame and a current frame to obtain an appropriate overdrive voltage. Therefore, data of the previous frame, stored in the memory 12 in advance, are read from the memory 12 via the memory interface unit 11 and is transmitted to the overdrive unit 14. Such reading step is represented by an arrow D in FIG. 3. The frame data processed by the overdrive unit 14 are transmitted to the LCD unit for display 15 via the overdrive unit 14.

As far as a next frame is concerned, a current frame is regarded as a previous frame. When the overdrive unit 14 is to process the next frame, the current frame is also needed as a look-up table reference. Therefore, the overdrive unit 14 stores data of the current frame into the memory via the memory interface unit 11. Such storing step is represented by an arrow C in FIG. 3. It is to be noted that, the data stored into the memory 12 in the storing step represented by the arrow C may be the data of the current frame processed by the image processor 13 or the data of the current frame processed by both the image processor 13 and the overdrive unit 14. Accordingly, the data stored into the memory 12 in the storing step represented by the arrow C will be the data read from the memory 12 in the reading step represented by the arrow D when the overdrive unit 14 processes the next frame.

In practice, the foregoing reading and storing steps, represented by different arrows, may be performed via a same transmission line at different time points. As for a stereo image system having a high resolution, since the data amount of each frame is quite large, the steps represented by the arrows A to D may excessively occupy a bandwidth. Therefore, the LCD system 10 hardly accounts as an ideal design since its memory access approach requires a rather high bandwidth for the memory 12.

SUMMARY OF THE INVENTION

In order to solve the foregoing problem, a novel memory access solution is provided according to the present invention, so as to effectively reduce bandwidth requirements for a memory in an image processing system by properly dividing and storing image data. A system and a method according to the present invention applicable to not only a stereo image processing system having capabilities of lengthening VBIs and overdrive processing, but also various types of image processing apparatuses that perform image processing according to a current image and an adjacent image.

According to an embodiment of the present invention, an image processing system comprises a memory, a data slicer and an image processor. The data slicer divides current image data and adjacent image data into a first portion and a second portion to be stored into the memory. The image processor reads from the memory the first portion and the second portion of the current image data, and the first portion of the adjacent image data for image processing.

According to another embodiment of the present invention, an image processing method, for processing current image data and adjacent image data, comprises dividing each of the plurality of image data into a first portion and a second portion to be stored into a memory; reading from the memory the first portion and the second portion of the current image data, and the first portion of the adjacent image data for image processing.

The advantages and spirit related to the present invention can be further understood via the following detailed description and drawings.

DETAILED DESCRIPTION OF THE PREFERRED EMBODIMENT

Figure 4:
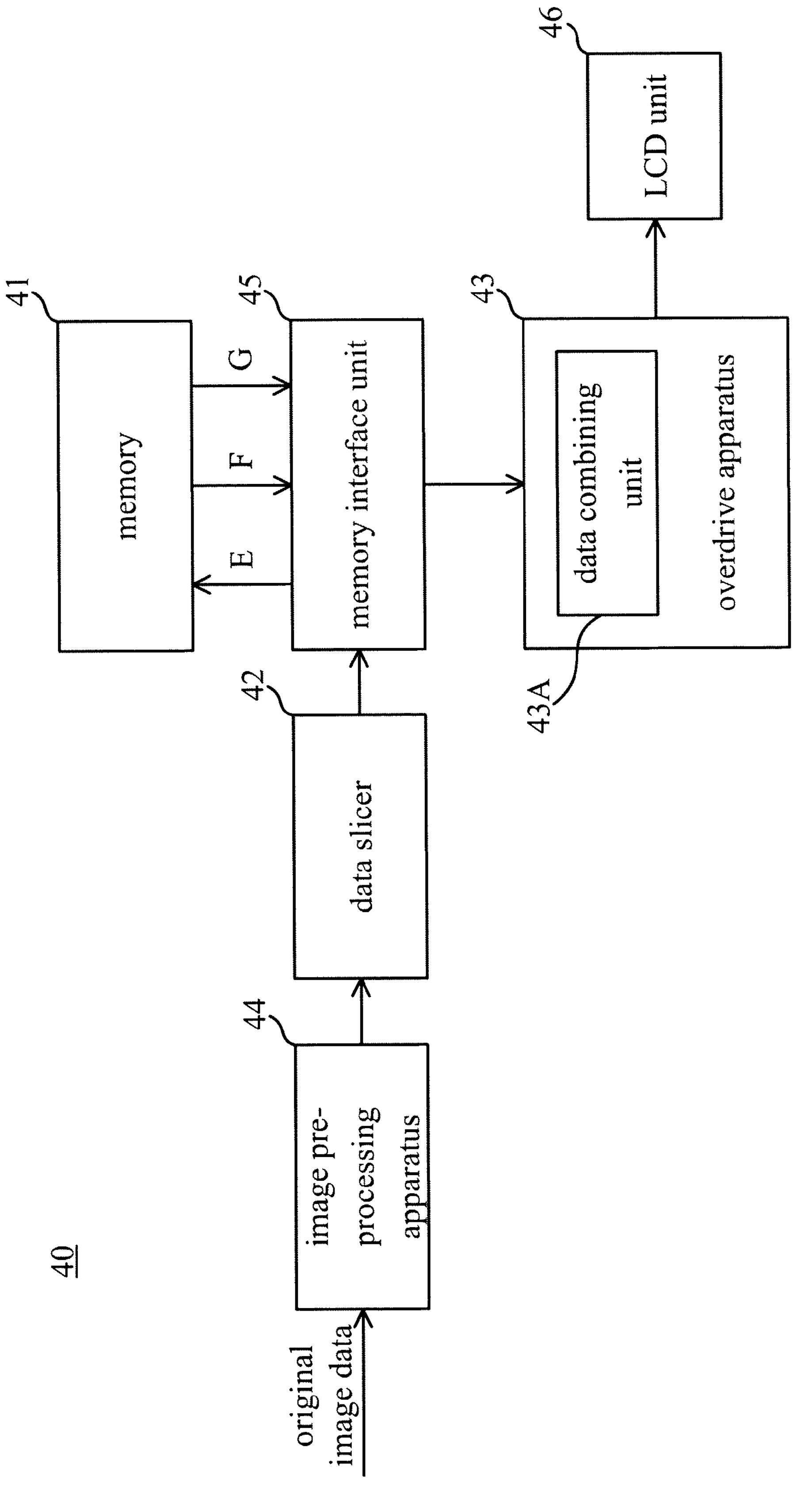
FIG. 4 is a block diagram of an image processing system in accordance with an embodiment of the present invention.

FIG. 4 shows an embodiment of an image processing system of the present invention. An image processing system 40 comprises a memory 41, a data slicer 42, an overdrive apparatus 43, an image pre-processing apparatus 44, a memory interface unit 45, and an LCD unit 46. The data slicer 42 and the overdrive apparatus 43 are coupled to the memory 41 via the memory interface unit 45.

The image pre-processing apparatus 44 receives original image data, and pre-processes the original image data. For example, the pre-processing includes white balance calibration, brightness adjustment, hue calibration and/or sharpening procedure. In this embodiment, the original image data corresponds to a temporal series of original frames inputted into the image processing system 40, e.g., numerous consecutive frames of a film. In practice, the image pre-processing apparatus 44 can be designed as pre-processing only one frame at a time.

After receiving the image data pre-processed by the image pre-processing apparatus 44, the data slicer 42 divides the image data into first partial data and second partial data. Suppose that current image data received by the data slicer 42 is an image of a video stream, and the image comprises 3 million pixels, each of which is represented by a 24-bit binary data. The data slicer 42 regards 12 most significant bits (MSBs) of each of the pixels as the first partial data, and 12 least significant bits (LSBs) as the second partial data. That is to say, the first partial data of the current image comprises MSB data of each of the 3 million pixels, and the second partial data of the current image comprises LSB data of each of the 3 million pixels.

For example, the data slicer 42 is designed with a first-in-first-out (FIFO) buffer. The data slicer 42 respectively stores the divided first partial data and the second partial data into the memory 41, and such storing step is represented by an arrow E in FIG. 4. For example, the memory 41 comprises two different blocks, which are respectively for storing the first partial data and the second partial data. In this embodiment, the memory 41 stores MSB data of an adjacent image other than the MSB data and LSB data of the current image. More specifically, the memory 41 stores MSB data of each of 3 million pixels of the adjacent image, which is a previous image or a next image of the current image of the video stream.

The overdrive apparatus 43 generates a plurality of overdrive signals according to data of the foregoing current image and the adjacent image, and controls a frame displayed on the LCD unit 46 via the plurality of overdrive signals. Accordingly, the overdrive apparatus 43 reads the MSB data and the LSB data of the current image from the memory 41 via the memory interface unit 45, and such reading step is represented by an arrow F in FIG. 4.

In this embodiment, in order to save time as well as reducing a complexity of determining appropriate overdrive signals with a look-up table, the overdrive apparatus 43 adopts only the MSB data of the adjacent image as a look-up table reference. Therefore, the overdrive apparatus 43 reads the MSB data of the adjacent image from the memory 41 via the memory interface unit 45 in addition to the foregoing MSB data and the LSB data of the current image, and such reading step is represented by an arrow G in FIG. 4. Since the MSB data and the LSB data of the adjacent image are separately stored in the memory 41, the MSB data of the adjacent image can be independently read from the memory via a simple addressing approach, and the LSB data of the adjacent image is left unread.

Referring to FIG. 4, the overdrive apparatus 43 can comprise a data combining unit 43A for combining the MSB data and the LSB data of the current data to restored data, i.e., a complete data of the current image. The overdrive apparatus 43 then performs an overdrive process according to the restored data and the MSB data of the adjacent image.

Figure 1:
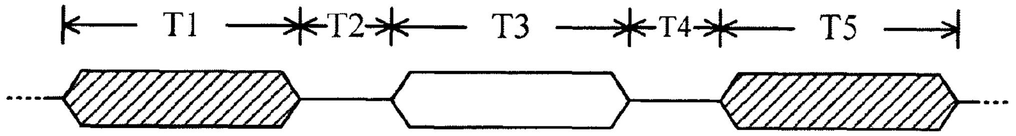
FIG. 1 is an example of a timing diagram when displaying image data by a stereo image display system.
Figure 2A:
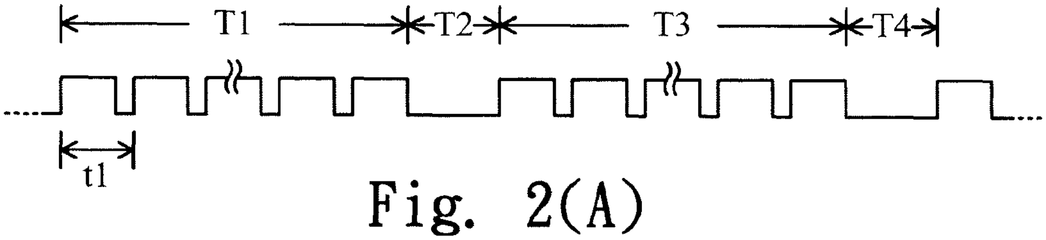
FIG. 2A shows an original timing diagram when image data is inputted into an image processing system.
Figure 2B:
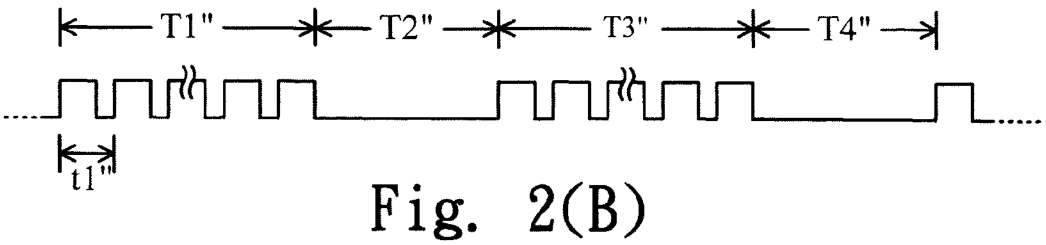
FIG. 2B shows an adjusted timing diagram when image data is transmitted to the display.
Figure 3:
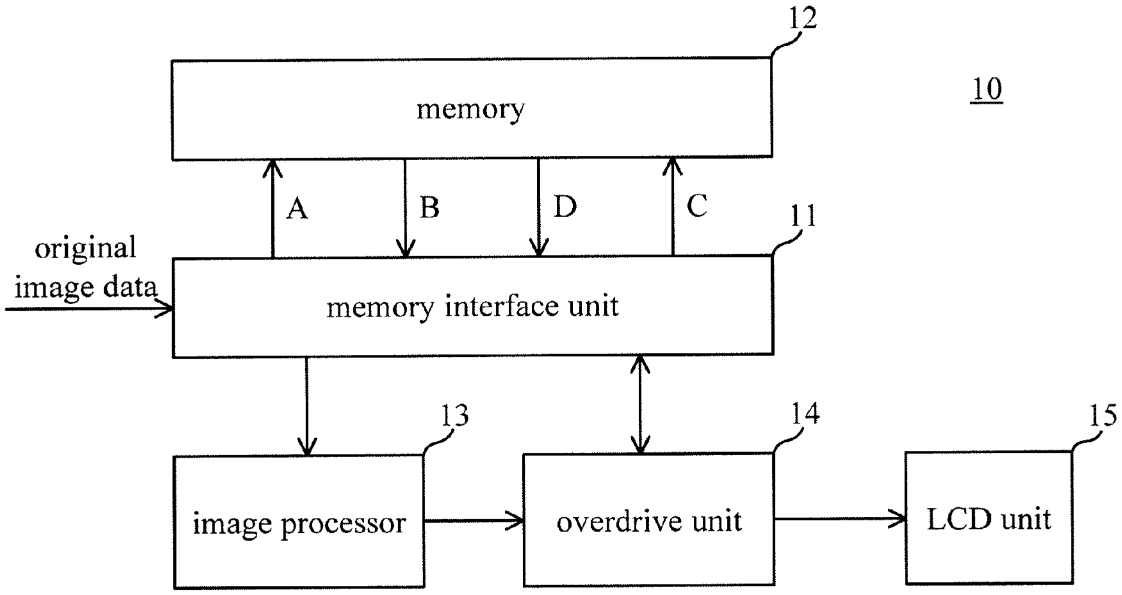
FIG. 3 is a block diagram of an LCD system having capabilities of lengthening VBIs and overdrive processing.

As observed from the foregoing description and FIG. 4, in this embodiment, the image processing system 40 only needs to perform the one storing step E and the two reading steps F and G with respect to the memory 41. In the prior art shown in FIG. 3, the two storing steps A and C are performed, and the two reading steps B and D are performed. Compared to the prior art, the image processing system 40 according to the present invention can reduce bandwidth requirements for the memory 41 while still achieving the overdrive process.

Figure 5:
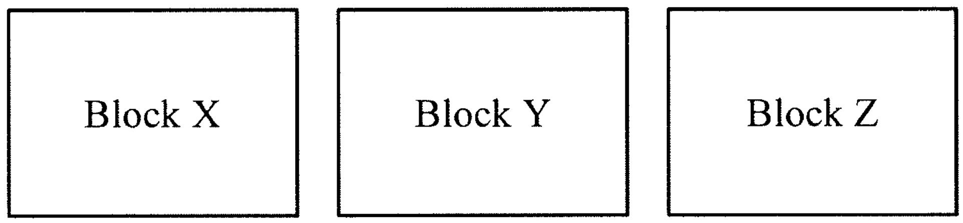
FIG. 5 shows blocks of a memory in accordance with an embodiment of the present invention.

In addition, since the data of each of the frames are divided into two parts in the storing step E, the MSB data of the adjacent image can be conveniently read from the memory in the reading step G but is not limited to the addressing approach, in which the MSB data is retrieved only after all of the data corresponding to the adjacent image are read. FIG. 5 shows an example of divided blocks inside the memory 41. In this example, the memory 41 comprises three blocks X, Y and Z, which are alternately read for effective utilization of memory spaces. For example, in an Nth storing step E, MSB data of an Nth frame are stored into the block X, and LSB data of the Nth frame are stored into the block Y. At this point, the block Z is stored with MSB data of an (N−1)th MSB data. In an (N+1)th storing step E, MSB data of an (N+1)th frame are stored into the block Y, i.e., the LSB data of the Nth frame are overwritten by the MSB data of the (N+1)th frame; and LSB data of the (N+1)th frame are stored into the block Z, i.e., the MSB data of the (N−1)th MSB data are overwritten by the LSB data of the (N+1)th frame. The MSB data of the Nth frame originally stored in the block X are maintained to be read by an (N+1)th reading step G.

In practical applications, the foregoing adjacent image may be a previous image or a next image of the current image of a video stream. In addition to the foregoing two possibilities, the overdrive apparatus 43 may regard data of numerous adjacent images as reference data for generating overdrive signals. Correspondingly, the memory 41 has to increase storage spaces for accommodating the reference data. Under the circumstances that the numerous adjacent images are adopted, the image processing system 40 according to the present invention only requires increasing the number of times of the reading steps with respect to the memory 41, but needs not to perform the storing step C in FIG. 3.

In practical applications, when the image processing system 40 is a stereo image system with capabilities of lengthening VBIs, operating frequencies of the storing step E and the reading step F may be different. More specifically, when the data slicer 42 stores the first partial data and the second partial data into the memory 41 according to a first frequency, the overdrive apparatus 43 reads the first partial data and the second partial data from the memory 41 according to a second frequency different from the first frequency, such that a VBI of the current image is adjusted.

Figure 6:
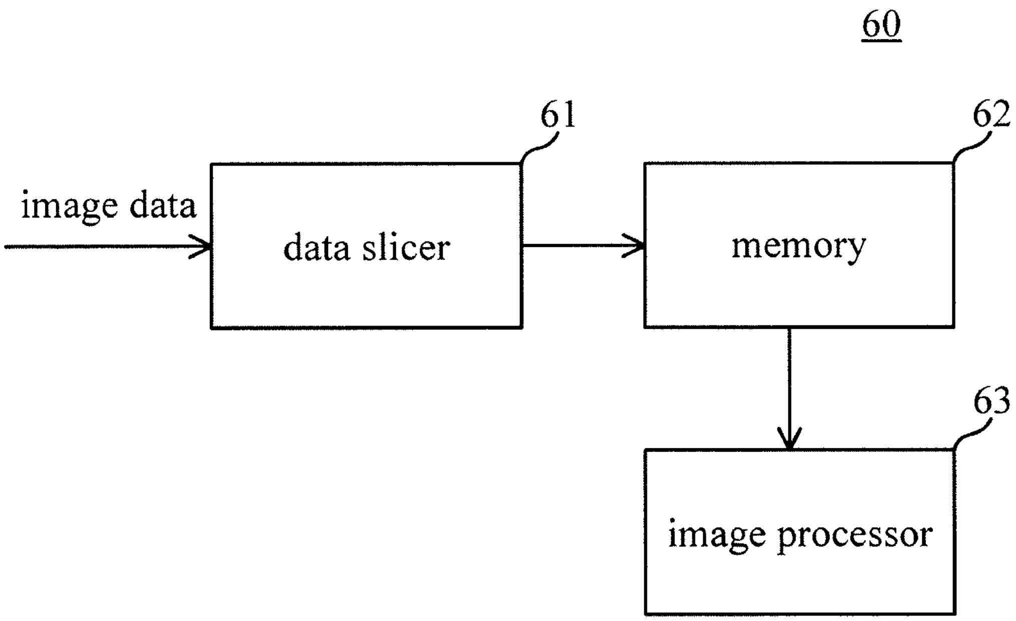
FIG. 6 is a block diagram of an image processing system in accordance with another embodiment of the present invention.

FIG. 6 shows an image processing system according to another embodiment of the present invention. An image processing system 60 comprises a memory 61, a data slicer 62 and an image processor 63. The data slicer 62, similar to the foregoing data slicer 42, divides image data into first partial data and second partial data to be stored into the memory 61. The image processor 63 reads from the memory 61 the first partial data and the second partial data of a current image, and the first partial data of an adjacent image for image processing. The image processing system 60 can be widely applied to image processing devices that perform image processing according to complete image data of an image and partial data of adjacent images. The image processing system according to the present invention also may only comprise the data slicer 62 and the image processor 63, and operate in conjunction with an external memory outside the image processing system.

Figure 7:
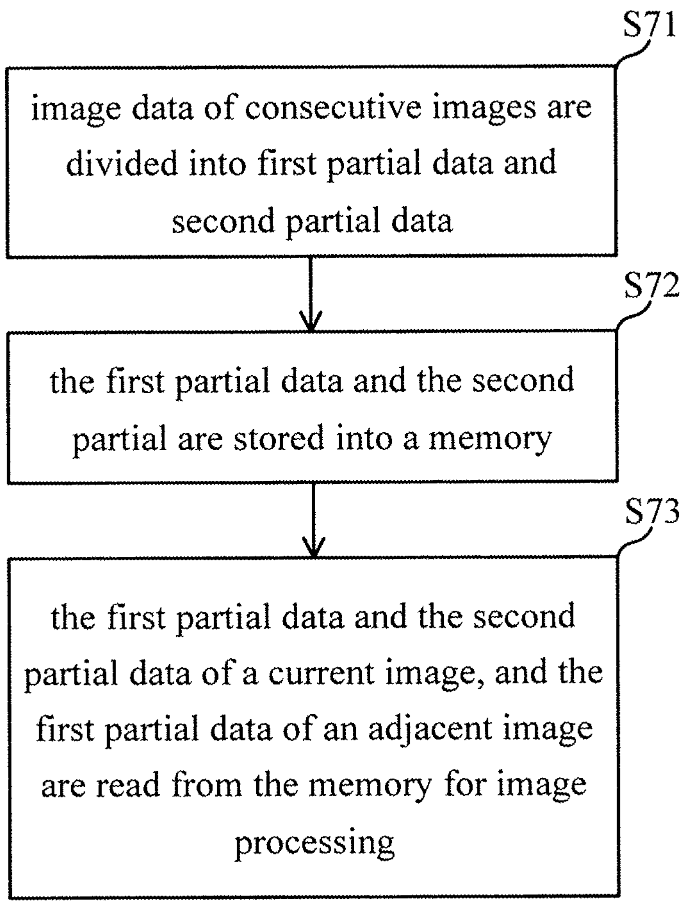
FIG. 7 is a flow chart of an image processing method in accordance with yet another embodiment of the present invention.

FIG. 7 is a flow chart of an image processing method according to an embodiment of the present invention. The method begins with Step S71 in which image data of consecutive images are divided into first partial data and second partial data. In Step S72, the first partial data and the second partial are stored into a memory. In Step S73, from the memory, the first partial data and the second partial data of a current image, and the first partial data of an adjacent image are read for image processing. The image processing method according to the present invention may further comprise combining the first partial data and the second partial data of the current image to restored data, and pre-processing the image data.

As mentioned above, the image processing system and the image processing method according to the present invention are capable of effectively reducing bandwidth requirements for a memory of the image processing system by properly dividing and storing image data. In addition, power consumption and the number of needed memories are reduced via a simplified access approach, such that cost of the image processing system is lowered. The solution according to the present invention is applicable to not only a stereo image processing system having capabilities of lengthening VBIs and overdrive process, but also image processing apparatuses performing image processing according to successive images.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing system, for processing current image data of a current frame and adjacent image data of an adjacent frame, comprising:

a memory;

a data slicer, for dividing each of the plurality of image data into a first portion and a second portion to be stored into the memory, wherein the plurality of image data comprise data of a plurality of pixels, the first portion comprises at least one most significant bit (MSB) data of each of the pixels, and the second portion comprises at least one least significant bit (LSB) data of each of the pixels; and an image processor, for reading from the memory the first portion and the second portion of the current image data, and only the first portion of the adjacent image data for image processing of the current image data of the current frame.

2. The system as claimed in claim 1, wherein the image processor is for overdriving liquid crystal cells.

3. The system as claimed in claim 1, wherein:

the image processor comprises a data combining unit, for combining the first portion and the second portion of the current image data to restored data, and the image processor performs the image processing according to the restored data and the first portion of the adjacent image data.

4. The system as claimed in claim 1, wherein the data slicer stores the first portion and the second portion of the current image data into the memory according to a first frequency, and the image processor reads the first portion and the second portion of the current image data from the memory according to a second frequency different from the first frequency, so as to adjust a vertical blanking interval (VBI) of the current image data.

5. The system as claimed in claim 1, further comprising:

a memory interface unit, for connecting the data slicer and the image processor to the memory.

6. The system as claimed in claim 1, further comprising:

an image pre-processing apparatus, for performing pre-processing on the plurality of image data before the plurality of image data are inputted into the data slicer.

7. The system as claimed in claim 6, wherein the pre-processing is white balance calibration, brightness adjustment, hue calibration or sharpening processing.

8. The system as claimed in claim 1, wherein the data slicer comprises a first-in-first-out (FIFO) buffer.

9. The system of claim 1, wherein the first portion of the adjacent image data read by the image processor consists only of the MSB data of each of the pixels.

10. An image processing method, for processing current image data of a current frame and adjacent image data of an adjacent frame, comprising:

(a) dividing each of the plurality of image data into a first portion and a second portion, wherein the plurality of image data comprise data of a plurality of pixels, the first portion comprises at least one most significant bit (MSB) data of each of the pixels, and the second portion comprises at least one least significant bit (LSB) data of each of the pixels;

(b) storing the first portion and the second portion into a memory; and (c) reading from the memory the first portion and the second portion of the current image data, and only the first portion of the adjacent image data for image processing of the current image data of the current frame.

11. The method as claimed in claim 10, wherein the image processing is for overdriving liquid crystal cells.

12. The method as claimed in claim 10, wherein the step (c) comprises:

combining the first portion and the second portion of the current image data to restored data; and performing the image processing according to the restored data and the first portion of the adjacent image data.

13. The method as claimed in claim 10, wherein in the step (b) the first portion and the second portion of the current image data are stored into the memory according to a first frequency, and in the step (c) the first portion and the second portion of the current image data are read from the memory according to a second frequency different from the first frequency, so as to adjust a vertical blanking interval (VBI) of the current image data.

14. The method as claimed in claim 10, before the step (a), further comprising:

performing pre-processing on the plurality of image data.

15. The method as claimed in claim 14, wherein the pre-processing is white balance calibration, brightness adjustment, hue calibration or sharpening processing.

16. The method as claimed in claim 10, wherein in the step (a) the plurality of image data are divided by an first-in-first-out (FIFO) buffer.

17. The method of claim 10, wherein reading from the memory of only the first portion of the adjacent image data consists only of reading from memory of the MSB data of the adjacent image data.

18. An image processing system, for processing current image data of a current frame and adjacent image data of an adjacent frame, comprising:

a data slicer, for dividing each of the plurality of image data into a first portion and a second portion to be stored into a memory, wherein the plurality of image data comprise data of a plurality of pixels, the first portion comprises at least one most significant bit (MSB) data of each of the pixels, and the second portion comprises at least one least significant bit (LSB) data of each of the pixels; and an image processor, for reading from the memory the first portion and the second portion of the current image data, and only the first portion of the adjacent image data for image processing of the current image data of the current frame.

19. The system as claimed in claim 18, wherein the data slicer stores the first portion and the second portion of the current image data into the memory according to a first frequency, and the image processor reads the first portion and the second portion of the current image data from the memory according to a second frequency different from the first frequency, so as to adjust a vertical blanking interval (VBI) of the current image data.

20. The system of claim 18, wherein the first portion of the adjacent image data read by the image processor consists only of the MSB data of each of the pixels.

* * * * *